US006229483B1

(12) United States Patent
Looström

(10) Patent No.: US 6,229,483 B1
(45) Date of Patent: May 8, 2001

(54) METHOD AND DEVICE RELATING TO SELF-CALIBRATION OF GROUP ANTENNA SYSTEM HAVING TIME VARYING TRANSMISSION CHARACTERISTICS

(75) Inventor: Lars Robert Looström, Norra Fiskebäcksvägen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/123,423

(22) Filed: Jul. 28, 1998

(30) Foreign Application Priority Data

Jul. 29, 1997 (SE) .................................................. 9702818

(51) Int. Cl.[7] .............................. G01S 3/16; G01S 13/00
(52) U.S. Cl. ........................................... 342/383; 342/174
(58) Field of Search .................................... 342/383, 372, 342/174, 378

(56) References Cited

U.S. PATENT DOCUMENTS

| | | | | |
|---|---|---|---|---|
| 4,673,939 | * | 6/1987 | Forrest | 342/174 |
| 5,063,529 | | 11/1991 | Chapoton | 364/571.02 |
| 5,412,414 | * | 5/1995 | Ast et al. | 342/174 |
| 5,838,674 | * | 11/1998 | Forssen et al. | 370/337 |

FOREIGN PATENT DOCUMENTS

| | | | | |
|---|---|---|---|---|
| 0 762 541 | | 3/1996 | (EP) . | |
| WO 95/34103 | * | 12/1995 | (WO) | H01Q/3/26 |

* cited by examiner

*Primary Examiner*—Gregory C. Issing
(74) *Attorney, Agent, or Firm*—Burns, Doane, Swecker & Mathis, L.L.P.

(57) ABSTRACT

The present invention concerns calibration of a group antenna system (11) with a number of radiation elements (X1, . . . , XN) and a number of controllable transmitters (T1, . . . , TN), in which the transmitters at the reception of an input signal transmit output signals for feeding the radiation elements. The calibration is done to be able to obtain a time varying antenna diagram at transmission and should be able to perform under operation without interrupting the normal operation of the group antenna system (11). The group antenna system comprises a control system for automatically correcting the control of the transmitters (T1, . . . , TN) for error deviations thereof. The group antenna system (11) comprises means (37) for generating a sum signal corresponding to the sum of the output signals. The control system generates error signals, giving information about the error deviations, employing the sum signal, the input signal and the complex amplifications varying with time for the transmitters. The control of the transmitters (T1, . . . , TN) is continuously corrected employing the error signals.

25 Claims, 5 Drawing Sheets

METHOD AND DEVICE RELATING TO SELF-CALIBRATION OF GROUP ANTENNA SYSTEM HAVING TIME VARYING TRANSMISSION CHARACTERISTICS

This application claims priority under 35 U.S.C. §§119 and/or 365 to 9702818-7 filed in Sweden on Jul. 29, 1997; the entire content of which is hereby incorporated by reference.

TECHNICAL FIELD

The present invention relates to a device and a method at antenna calibration; in particular the invention relates to the calibration of group antenna systems.

BACKGROUND OF THE INVENTION

Many technical applications comprise some form of antenna function, in which signals are received or transmitted via air. Examples of such applications are radio devices, TV sets, mobile telephony systems and radar systems.

The demands of directional function of an antenna varies with the application. A radio device shall be able to receive signals from different radio stations independent of where it is placed and therefore, an antenna of the radio device shall be sensitive in all directions in the horizontal plane. However, a TV receiver shall only be sensitive for signals coming from the nearest TV antenna. An antenna of a TV receiver has to be arranged so it is sensitive in particular for signals coming from the nearest TV antenna. Thus, an antenna of a TV receiver has to be arranged so it is sensitive in particular for signals coming from a particular direction, and signals coming from other directions have to be reduced as much as possible. An antenna in a base station in a mobile telephony system shall be able to receive signals from mobile telephones independently of where they are situated. When the base station shall transmit to one of the mobile telephones it can be desirable to transmit signals only in one direction to the particular mobile telephone, to be able to save power and not to interfere with other radio communication.

A type of antenna which can have directional function is the so called group antenna. A group antenna comprises a number of radiation elements, co-operating to give desirable radiation characteristic. The radiation elements consist normally of dipoles, horns or micro-strip elements (so called patches). Furthermore, an active group antenna comprises a number of transmitters, via a distribution network receiving an input signal and transmitting output signals. The output signals are employed to feed the radiation elements. The distribution network together with the transmitters constitutes a lobe-forming network. The group antenna is constructed so the output signals transfer to the radiation elements directly or via some form of external lobe-forming network, e.g. a Butler matrix or a Blass matrix. Controlling of the directional function of a group antenna—an antenna diagram—is obtained by controlling mutually phase-shifting and amplification of the transmitters. The group antenna can of course also be used for reception. Then, the group antenna comprises a number of receivers, wherein the group antenna is so constructed that signals received by the radiation elements are transferred to the receivers, e.g. via the external lobe-forming network.

To be able to achieve a particular antenna diagram of a group antenna with relatively good accuracy it is required that the amplification of the transmitters and in particular the phase-shifting can be well controlled. To be able to obtain this the transmitters must be calibrated. Prior art discloses a large number of proposals of constructions and methods for calibration of group antennas. Often the calibration is done in calibration sets where special calibration signals are employed. For instance, U.S. Pat. No. 5,063,529 describes how a group antenna can be calibrated for reception employing special calibration signals.

A disadvantage with calibrating during calibration sets by employing special calibration signals is that the normal operation of the group antenna must be interrupted during the calibration. For instance in a mobile telephone system this causes that part of the time cannot be used for the normal communication, of course implying decreased incomes for an operator.

DISCLOSURE OF THE INVENTION

The present invention solves the problem how a group antenna system shall be able to be calibrated so a with time varying desired antenna diagram at transmission is obtained, without disruption of the normal operation of the group antenna system or influence in some other way of the calibration.

Above disclosed problems are generally solved according to the following. The group antenna system comprises a number of transmitters and a number of radiation elements. An input signal, which can be modulated for normal radio traffic, is applied to the transmitters, and thereby the transmitters transmit output signals. The output signals are transferred to the radiation elements for feeding the radiation elements. Mutual phase-shifting and amplification of the transmitters are controlled for the desired antenna diagram at transmission to be obtained. Hereby, phase-shifting and amplification for each transmitter shall correspond to a requested phase-shifting and a requested amplification for each transmitter. However, imperfections—error deviations—of the transmitters imply that this is not always fulfilled. According to the invention it is provided that the normal traffic, i.e., the input signal and the output signals, is employed for obtaining information about these error deviations. Therefore, according to the invention error signals are generated corresponding to the error deviations of the transmitters depending on the input signal, the output signals, the requested phase-shifts and the requested amplifications. The error signals are employed for correcting the control of the transmitters for the error deviations.

Thus, the object of the invention is to employ normal traffic for obtaining information about error deviations of the transmitters and by employing this information correct the controlling of the transmitters for error deviations, wherein the invention comprises devices and methods for obtaining this.

The disclosed problem above is solved more specifically according to the following. The group antenna system comprises means for generating a sum signal corresponding to a sum of the output signals from the transmitters. The means for generating the sum signal can for instance consist of an adder connected to the transmitters so it thereby receives signals corresponding to the output signals. The adder sums the received signals, wherein the sum signal is obtained. Furthermore, the group antenna system comprises means for generating the error signals from the input signal, the sum signal, the requested phase-shifts and the requested amplifications. The sum signal implies that the error signals for all transmitters can be generated simultaneously. Preferably, the group antenna system comprises filters for generating correction signals by a noise-reducing filtering of the error signals. The correction signals are employed when the control of the transmitters is corrected for the error signals.

A major advantage of the invention is that the group antenna can be employed in normal operation during calibration. Yet another advantage is that the calibration can be performed continuously so that the group antenna is always well calibrated.

The invention will now be further described in preferred embodiments and with reference to accompanying drawings.

PREFERRED EMBODIMENTS

Figure 1:
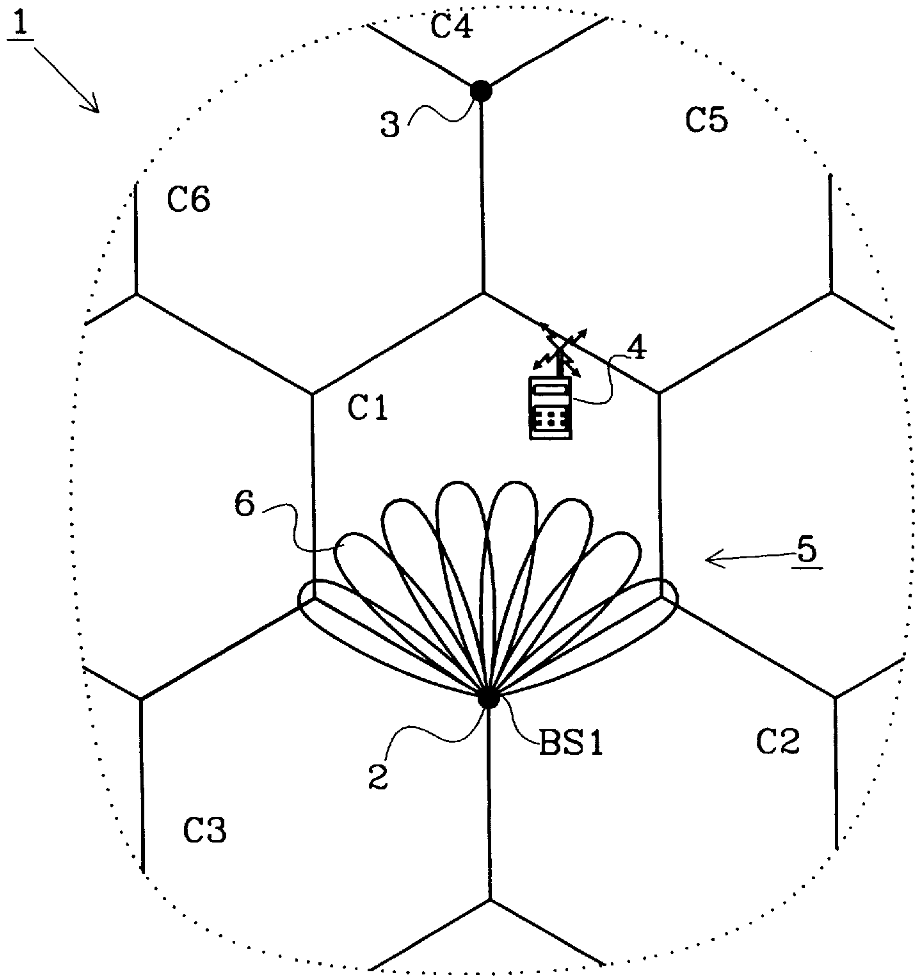
FIG. 1 is a principle view illustrating communication in a mobile telephony system.

In FIG. 1 a part of a mobile telephony system 1 is illustrated. In a first position 2 three base stations are located, in which one of said base stations is designated BS1. The base stations in the first position 2 serve sector cell C1, C2 and C3, respectively, wherein the base station BS1 serves the sector cell C1. In a second position 3 three further base stations are located. The base stations in the second position 3 serve also one sector cell C4, C5 and C6 each. In the sector cell C1 a mobile station 4 is located. The mobile station 4 is in transmission and the transmission from the mobile station 4 is received via an antenna belonging to the base station BS1. An antenna diagram 5 at reception for the antenna corresponding to the base station BS1 is illustrated in FIG. 1. The antenna diagram 5 has a fan-shape and comprises a number of partly overlapping lobes 6. An antenna diagram such as the antenna diagram 5 can be obtained with a group antenna employing any form of lobe-forming network, e.g. a so called Butler matrix, which is well-known for a person skilled in the art. By employing a group antenna with a Butler matrix it is possible in the situation as is illustrated in FIG. 1 to detect each one of the lobes 6 independently. According to prior art it is also possible to combine nearby lobes and thereby form lobes in random directions. This implies that the base station BS1 can decide the direction to the mobile station 4.

When the base station BS1 shall transmit to the mobile station 4 it is of course not optimal if a similar antenna diagram at transmission as the antenna diagram 5 at reception is employed. At transmission from the base station BS1, the radiation power should be concentrated to such an extent that is possible in direction to the mobile station 4. It is also important to use as low power as possible to be radiated in directions where other transmitters of receivers are located, so they are not interfered. For instance, if it is possible, no power should be radiated in direction to the base stations in the second position 3 or to other base stations in the mobile telephony system 1. At transmission from the base station BS1 to the mobile station 4 the antenna diagram should be designed at transmission so that the head lobe is directed to the mobile station 4 and that so called zero-deeps are created in the directions where interference should be avoided.

Figure 2:
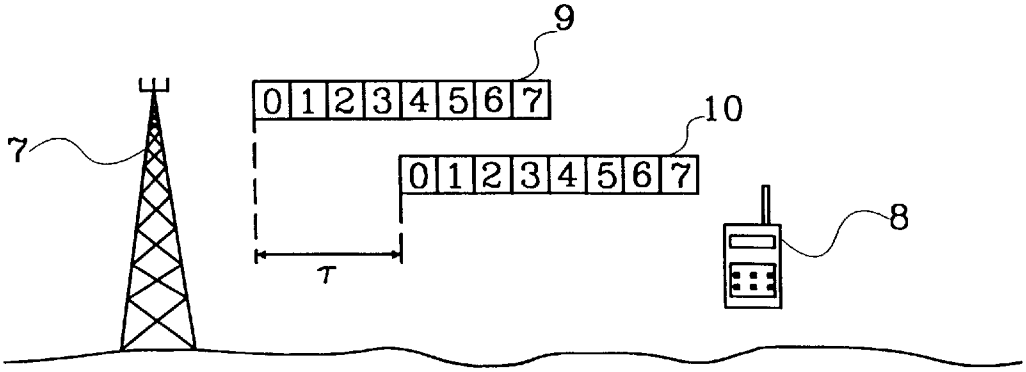
FIG. 2 is a schematic diagram illustrating communication between a base station and a mobile station in a TDMA system.

In FIG. 2 is illustrated radio communication between a base station 7 and a mobile station 8 in a mobile telephony system of TDMA type (Time Division Multiple Access). The up-link communication occurs by modulation of a first carrier wave. The communication of the first carrier wave is divided in time in a number of so called frames and in FIG. 2 is illustrated such an up-link frame 9. The up-link frame 9 is furthermore divided into eight time slots, numbered from zero to seven. The down-link communication occurs correspondingly by modulation of a second carrier wave. The communication of the second carrier wave is also divided into a number of frames, and in FIG. 2 is illustrated such a down-link frame 10. The down-link frame 10 is divided in eight time slots, numbered from zero to seven. The down-link communication to the mobile station 8 occurs in one of the time slots in the down-link frame 10, e.g. time slot number two. The up-link communication from the mobile station 8 to the base station occurs in a time slot number 2 in the up-link frame 9. The up-link frame 9 and the down-link frame 10 have a mutual time shift ι (offset time)—in the GSM system (Global System for Mobile communications) corresponding to fore time slots. Thus, the time slot number two in the up-link frame 9 is not simultaneous with the time slot number two in the down-link frame 10. This means that the base station 7 does not receive signals from the mobile station 8 simultaneously as it transmits signals to the mobile station 8. Thus, the base station 7 has the possibility after reception of signals from the mobile station 8 to determine in which direction the mobile station 8 is located and how an antenna diagram at transmission should be designed when signals are to be transmitted to the mobile station 8.

To be able to obtain a particular antenna diagram with a group antenna it is normally required, as disclosed above, that the group antenna is calibrated with even spaces, wherein the normal use of the group antenna must be disrupted. Hereby the present invention will now be described with reference to FIGS. 3 to 8. According to the invention it is provided how a group antenna can be calibrated without disrupting its normal operation.

Figure 3:
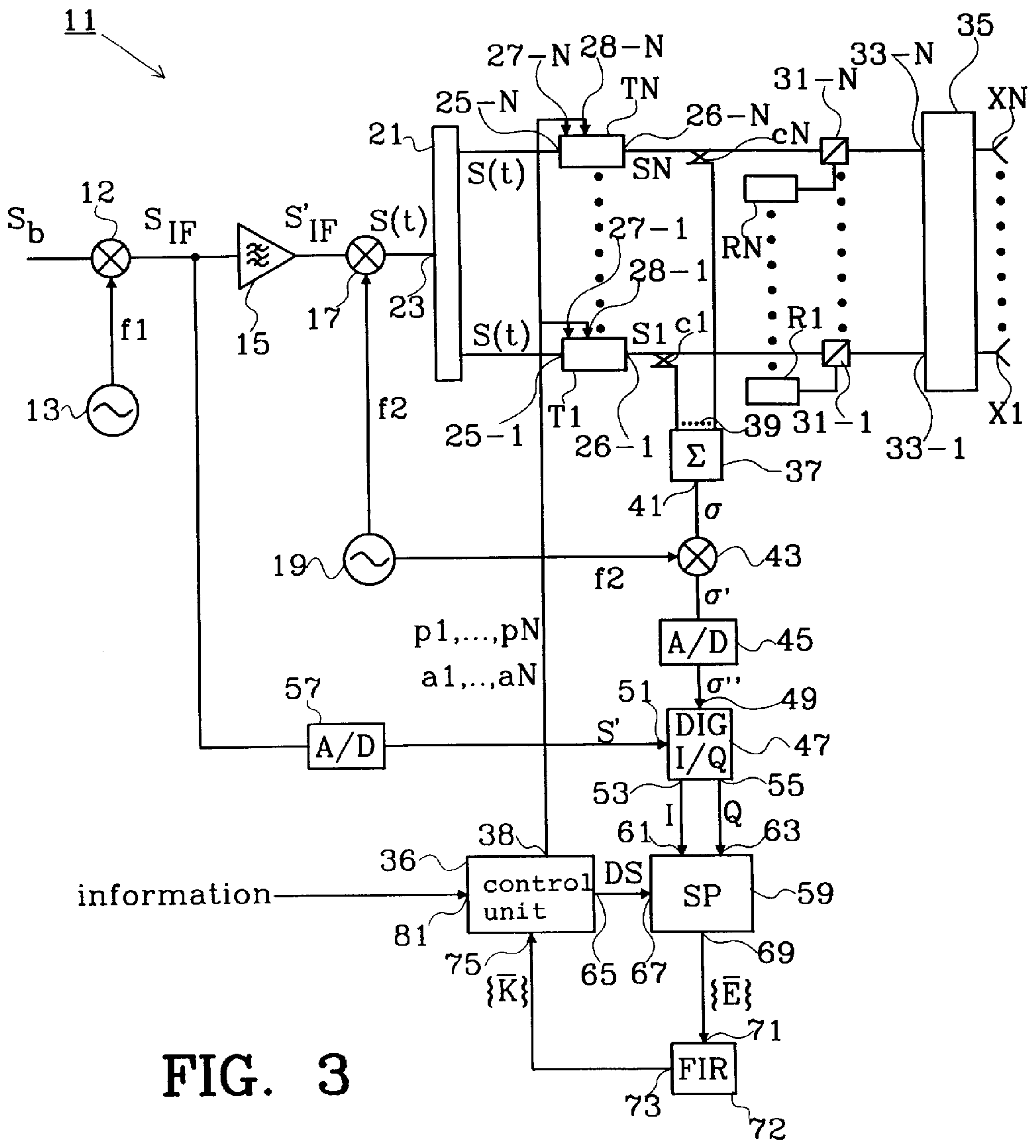
FIG. 3 is a block schematic over a construction of a group antenna system.

In FIG. 3 is illustrated a group antenna system 11 according to the present invention. The group antenna system 11 can for instance be employed for duplex communication in the base station BS1 in the mobile telephony system 1 or in the base station 7 in the TDMA system according to FIG. 2. The invention is not limited only to said applications, but can of course be employed everywhere where it is applicable.

The group antenna system 11 comprises a first mixer 12. The first mixer 12 is connected to a first local oscillator 13 and receives a first oscillator signal with a first frequency f1 from the first local oscillator 13. Furthermore, the first mixer 12 receives one for radio traffic modulated base band signal $S_b$. The first mixer 12 generates by mixing the base band signal $S_b$ an intermediate frequency signal $S_{IF}$. The group antenna system 11 comprises an intermediate frequency step in the form of a band pass amplifier 15 with an input and an output. The input of the band pass amplifier 15 is connected to said first mixer 12 and the band pass amplifier 15 receives the intermediate frequency signal $S_{IF}$. The band bass amplifier 15 transmits via its output an amplified intermediate frequency signal $S'_{IF}$, corresponding to the intermediate frequency signal $S_{IF}$. Furthermore, the group antenna system 11 comprises a second mixer 17. The second mixer 17 is connected to a second local oscillator 19 and receives a second oscillator signal with a second frequency f2 from said second local oscillator 19. The second mixer 17 is also connected to the output of the band pass amplifier 15 and receives the amplified intermediate frequency signal $S'_{IF}$. The second mixer 17 generates by mixing the amplified intermediate frequency signal $S'_{IF}$ a radio frequency signal S(t). The group antenna system 11 comprises a distribution network 21 with a distribution connection 23. The distribution connection 23 is connected to the second mixer 17 and the distribution network 21 receives the radio frequency signal S(t) via the distribution connection 23.

The group antenna system 11 in FIG. 3 comprises a number (N) of transmitters T1, . . . ,TN with inputs 25-1, . . . ,25-N and outputs 26-1, . . . ,26-N. For simplicity in FIG. 3 only transmitter number one Ti and transmitter number N TN are shown. The inputs of the transmitters T1, . . . ,TN, 25-1, . . . ,25-N, are connected to the distribution network 21. The distribution network 21 distributes in a known way the radio frequency signal S(t) as an input signal, which can also be designated S(t), to the inputs of the transmitters 25-1, . . . ,25-N. The transmitters T1, . . . ,TN transmit output signals S1, . . . ,SN via their outputs 26-1, . . . ,26-N, which will be described in more detail in the following. The output 26-1, . . . ,26-N of each transmitter T1, . . . ,TN is connected to a corresponding duplex filter 31-1, . . . ,31-N. For simplicity only duplex filter number one 31-1 and duplex filter number N 31-N are shown in FIG. 3. Each duplex filter 31-1, . . . ,31-N is furthermore connected to a corresponding signal connection 33-1, . . . ,33-N of a Butler matrix 35. Furthermore, the Butler matrix 35 is connected to a number (N) of radiation elements X1, . . . ,XN. For simplicity only radiation element number one X1 and radiation element number N XN are shown in FIG. 3. Thus, the group antenna system 11 transfers the output signals S1, . . . ,SN to the radiation elements X1, . . . ,XN via the duplex filters 31-1, . . . ,31-N and the Butler matrix 35, whereby the radiation elements X1, . . . ,XN transmit electromagnetic radiation. Each of the duplex filters 31-1, . . . ,31-N are connected to a corresponding receiver R1, . . . ,RN. The group antenna system 11 transfers signals which are received via the radiation elements X1, . . . ,XN to the receivers R1, . . . ,RN via the Butler matrix 35 and the duplex filters 31-1, . . . ,31-N.

Furthermore, the group antenna system 11 in FIG. 3 comprises a control unit 36. The control unit 36 comprises means for generating control signals p1, . . . ,pN and a1, . . . ,aN for controlling the transmitters T1, . . . ,TN. Said control is done in a known way to obtain a desired antenna diagram at transmission based on e.g. the direction to the mobile station 4 and possible desired zero depths. Information about the desired antenna diagram at transmission is supplied to the control unit 36 via a signal input 81. The control unit 36 transmits the control signals p1, . . .pN and a1, . . . ,aN via a first set of control signal outputs 38. The control signal outputs in the first set of control signal outputs 38 of the control unit 36 are connected to corresponding control signal inputs 27-1, . . . ,27-N and 28-1, . . . ,28-N of the transmitters T1, . . . ,TN.

Figure 4:
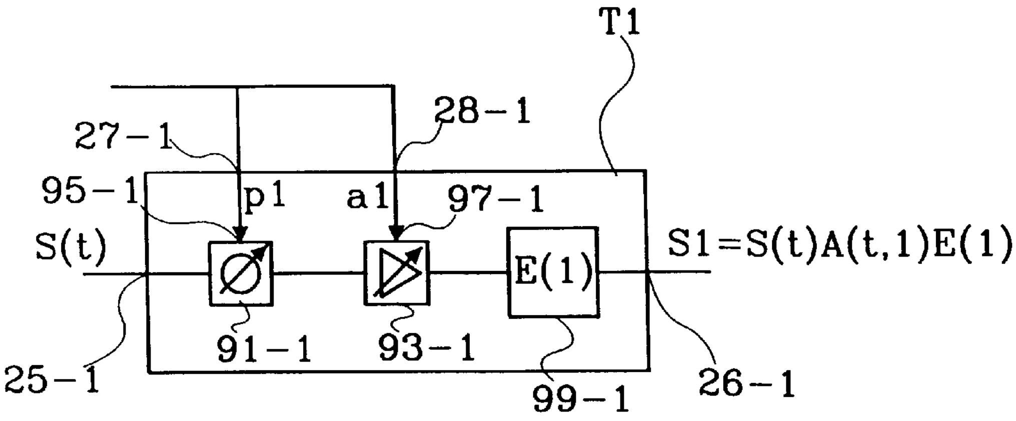
FIG. 4 is a block schematic over a construction of a transmitter of a group antenna system.

In FIG. 4 is illustrated an example of a block schematic over a construction of the transmitter number one T1. The transmitter number one T1 in FIG. 4 comprises control means 91-1 and 93-1 for controlling a complex amplification for the transmitter number one T1. In this disclosure complex quantities are used, as is common in the present technological field. The use of complex quantities enables a simultaneous treatment of phase and amplitude information. The complex amplification for the transmitter number one T1 means that the transmitter T1 has a phase shift corresponding an argument to the complex amplification for the transmitter number one T1 and an amplification corresponding an absolute value of the complex amplification for the transmitter number one T1. The control means consist in FIG. 4 of a controllable phase shifter 91-1 and a controllable amplifier 93-1. The controllable phase shifter 91-1 comprises a control signal input 95-1 for receiving the control signal p1 from the control unit 36. The controllable amplifier 93 comprises a control signal input 97-1 for receiving the control signal a1 from the control unit 36.

To be able to obtain a desired antenna diagram at transmission using the group antenna system 11 it is required, which is well-known for a person skilled in the art, that the complex amplification for transmitter number one T1 shall correspond to one for the transmitter number one T1 requested complex amplification A(t,1). The complex amplification for the transmitter number one T1 deviates normally from the requested complex amplification A(t,1). This deviation can be described with a complex (multiplicative) error E(1) for the transmitter number one T1. The complex error E(1) is indicated symbolically in FIG. 4 with a block 99-1. The output signal S1 from the transmitter number one T1 can with introduced notations be written as:

$$S1 = S(t)A(t,1)E(1) \quad (1).$$

The remaining transmitters T2, . . . ,TN are constructed correspondingly as the transmitter number one T1 and comprise controllable phase shifters 91-2, . . . ,91-N and controllable amplifiers 93-2, . . . ,93-N, controlled of the control signals p2, . . . ,pN and a2, . . . ,aN from the control unit 36. Correspondingly to the transmitter number one T1 requested complex amplifications A(t,2), . . . ,A(t, N) and complex errors E(2), . . . ,E(N) are associated with remaining transmitters T2, . . . ,TN. The theory for selection of the requested complex amplifications A(t,1), . . . ,A(t, N) for a particular required antenna diagram at transmission to be obtained is something which is well-known for a person skilled in the art. Therefore, the present description does not disclose this theory in more detail. The requested complex amplifications A(t,1), . . . ,A(t, N) vary with time t to be able to obtain different desired antenna diagrams at transmission. Also the complex errors E(1), . . . ,E(N) vary with time. The time variation of the complex errors E(1), . . . ,E(N) can be direct, for instance caused by component drift, due to aging of the electronics in the transmitters T1, . . . ,TN. The time variation of the complex errors E(1), . . . ,E(N) can also be indirect, for instance caused by temperature variations. The complex errors E(1), . . . ,E(N) vary in time considerably slower than the input signal S(t) and the requested complex amplifications A(t, 1), . . . ,A(t, N) vary.

The group antenna system 11 in FIG. 3 comprises a control system, modifying the control signals p1, . . . ,pN and a1, . . . ,aN automatically so the controlling of the controllable phase shifters 91-1, . . . ,91-N and the controllable amplifiers 93-1, . . . -93-N are corrected for the complex errors E(1), . . . ,E(N), wherein said complex amplifications for the transmitters T1, . . . ,TN correspond to the requested complex amplifications A(t,1), . . . ,A(t, N). In the following the construction and function of the control system are disclosed. The group antenna system 11 in FIG. 3 comprises an adder 37 with a number of inputs 39 and an output 41. Each of said inputs 39 of the adder 37 are connected via a corresponding direction switch c1, . . . ,cN to a corresponding output 26-1, . . . ,26-N of the transmitters T1, . . . ,TN. Thus, the adder 37 receives via its inputs 39 signals corresponding to the output signals S1, . . . ,SN. Furthermore, the adder 37 transmits via its output a sum signal σ, corresponding to a sum of the output signals S1, . . . ,SN, in that:

$$\sigma = \sum_{i=1}^{N} S(t)A(t, i)E(i). \tag{2}$$

Furthermore, the group antenna system 11 comprises means for mixing the sum signal σ to the input signal S(t). Because of this reason, the group antenna system 11 comprises a digital quadrature demodulator 47. The construction and function of the quadrature demodulator are well-known to a person skilled in the art. The group antenna system 11 comprises a first analogue-digital (A/D) converter 45. The sum signal σ, being in the radio frequency range, varies too quickly for direct analogue-digital conversion. Therefore, the group antenna system 11 in FIG. 3 mixes the sum signal σ to intermediate frequency. Thus, the group antenna system 11 comprises a third mixer 43. The third mixer 43 is connected to the second local oscillator 19 and receives a third oscillator signal with said second frequency f2 from said second local oscillator 19. The third mixer 43 is connected to the output 41 of the adder 37 and receives the sum signal σ. The third mixer 43 generates by mixing the sum signal car a mixed sum signal σ'. The first analogue-digital converter 45 is connected to the third mixer 43 and receives the mixed sum signal σ'. Said first analogue-digital converter 45 analogue-digital converts the mixed sum signal σ', wherein a mixed and analogue-digital converted sum signal σ" is obtained. A first signal input 49 of the digital quadrature demodulator 47 is connected to said first analogue-digital converter 45, wherein said digital quadrature demodulator 47 receives the mixed and analogue-digital converted sum signal σ" via its first signal input 49. The group antenna system 11 comprises a second analogue-digital converter 57 for analogue-digital conversion of the intermediate frequency signal $S_{IF}$. Thus, any mixing of the input signal S(t) is not necessary, as a mixed version of the input signal S(t) already exists in the form of the intermediate frequency signal $S_{IF}$. Thus, said second analogue-digital converter 57 is connected to said first mixer 12 and receives a signal corresponding to the intermediate frequency signal $S_{IF}$. Said second analogue/digital converter 57 analogue-digital converts said intermediate frequency signal $S_{IF}$, wherein a mixed and analogue-digital converted input signal S' is obtained. A second signal input 51 of the digital quadrature demodulator 47 is connected to said second A/D-converter 57 and the digital quadrature demodulator 47 thereby receives said mixed and analogue-digital converted input signal S' via its second signal input 51. Said digital quadrature demodulator 47 transmits a first quadrature signal I (in-phase) via a first signal output 53 and a second quadrature signal Q (quadrature-phase) via a second signal output 55. The signal outputs 53 and 55 of the digital quadrature demodulator 47 are connected to corresponding signal inputs 61 and 63 of a signal transformation unit 59. The signal transformation unit 59 also comprises a data signal input 67 connected to a corresponding data signal output 65 of the control unit 36. The signal transformation unit 36 receives via the data signal input 67 a data signal DS generated by the control unit 36. The signal transformation unit 59 generates error signals {E(1)}, . . . ,{E(N)} from the quadrature signals I and Q and information from the data signal DS corresponding to the complex errors E(1), . . . ,E(N). The error signals {E(1)}, . . . ,{E(N)} are indicated collectively in FIG. 3 as {$\bar{E}$}. The method of operation for the signal transformation unit 59 for generating the error signals {E(1)}, . . . ,{E(N)} will be described in more detail in the following.

The error signals {E(1)}, . . . {E(N)} are transmitted from the signal transforming unit 59 via a number of signal outputs, collectively designated by reference numeral 69. Furthermore, the group antenna system 11 comprises a control filter 72 for filtering noise from said error signals {E(1)}, . . . {E(N)}. The control filter 72 can for instance comprise a FIR filter, i.e. a linear filter with finite impulse response, but of course also other types of noise reducing filters can be employed. The length of the impulse response is suitably adapted to how quickly the complex errors E(1), . . . E(N) are changed in the present application. The control filter 72 comprises a number of signal inputs, which collectively are designated by reference numeral 71. The signal outputs 71 are connected to the signal outputs 69, and the control filter 72 receives the error signals {E(1)}, . . . {E(N)}. The control filter 72 filters said error signals {E(1)}, . . . {E(N)}, and by said filtering a number of correction signals {K(1)}, . . . , {K(N)} are obtained corresponding to a filtration of each of said error signals {E(1)}, . . . {E(N)}. The correction signals {K(1)}, . . . ,{K(N)} are collectively indicated in FIG. 3 as {$\bar{K}$}. The correction signals {K(1), . . . ,{K(N)} are transmitted from said control filter 72 via a number of signal outputs, which collectively are designated 73. The control unit 36 comprises a number of signal inputs, which collectively are designated with reference numeral 75. The signal outputs 73 are connected to the signal outputs 75, and the control unity 36 thereby receives the correction signals {K(1)}, . . . ,{K(N)}. The control unit 36 generates the control signals p1, . . . ,pN and a1, . . . ,aN using the correction signals {K(1)}, . . . ,{K(N)}, so a correction is done at the transmission of the transmitters for the complex errors E(1), . . . ,E(N); How this is performed is described in more detail in the following.

Figure 5:
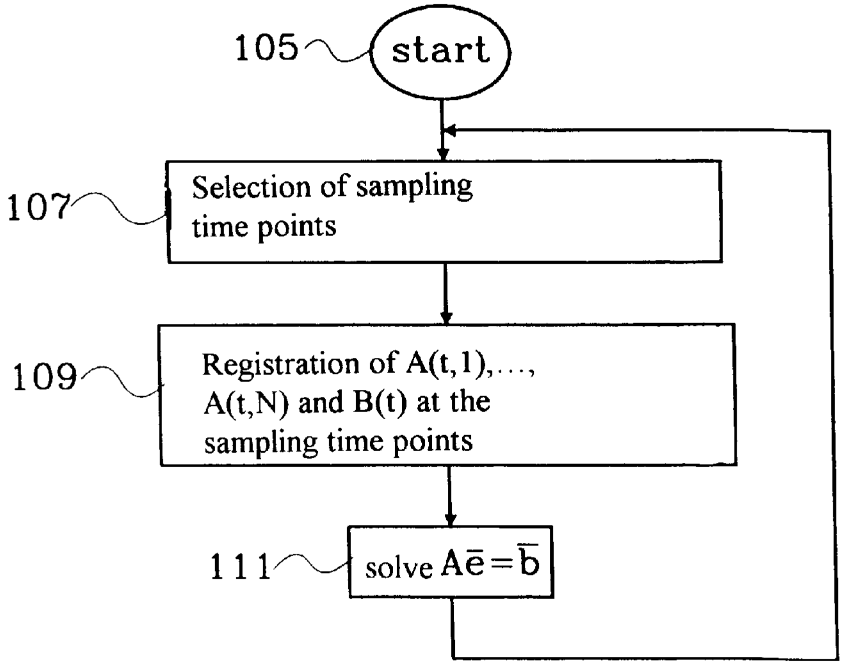
FIG. 5 is a flowchart illustrating generation of error signals in a group antenna system.

In FIG. 5 is shown a flow chart illustrating an example of the operation of the signal processing unit 59 to generate the error signals {E(1), . . . ,{E(N)}. A complex signal B(t) is introduced according to: B(t)=I+jQ, where j is the imaginary unit. The complex signal B(t) is related, as is clear to a person skilled in art by using the equation (2), to the requested complex amplifications A(t, 1), . . . ,A(t, N) and the complex errors E(1), . . . ,E,(N) by:

$$B(t) = \sum_{i=1}^{N} A(t, i)E(i). \tag{3}$$

The complex signal B(t) is as is shown independent of the input signal S(t).

The method of FIG. 5 is started, after a start 105, by a first step 107, comprising a number (M; M≧N) of sampling time points $t_k$, k=1, . . . , M to be selected.

The method in FIG. 5 proceeds with a second step 109, comprising the requested complex time amplifications A(t, 1), . . . ,A(t, N) and the complex signal B(t) to be registered by the signal processing unit 59 at the selected sampling time points $t_k$, k=1, . . . , M. The signal processing unit 59 receives information about the requested amplifications A(t, 1), . . . ,A(t, N) from the control unit 36 by the data signal DS. At the second step 109 in FIG. 5 a first number (M×N) of complex values is obtained $A(t_k, i)$ k=1, . . . ,M; i=1, corresponding to the registration of the requested complex amplifications A(t, 1), . . . ,A(t, N). At the second step 109 in FIG. 5 also a second number (M) of complex values $B(t_k)$ k=1, . . . ,M, corresponding to the registration of the complex signal B(t) is obtained. By employing said first and second number of complex values $A(t_k, i)$ and $B(t_k)$ and equation (3) a number of algebraic equations for the complex errors E(1), . . . ,E(N) be set as follows:

$$B(t_k) = \sum_{t=1}^{N} A(t_k, i)E(i), k-1, \ldots, M \quad (4)$$

The equations (4) can be written in matrix form as:

$$A\bar{e}=\bar{b} \quad (5)$$

The following notations have been introduced:

$$A \equiv \begin{pmatrix} A(t_1, 1) & \cdots & A(t_1, N) \\ \vdots & \ddots & \vdots \\ A(t_M, 1) & \cdots & A(t_M, N) \end{pmatrix}$$

$$\bar{e}=(F(1), \ldots, E(N))^T$$

$$\bar{b}=(B(t_1), \ldots, B(t_M))^T.$$

The method in FIG. 5 proceed in a third step 11, implying that the signal processing unit 59 generates a solution to the equation set (5) for said unknown complex errors $\bar{e}$. A solution to the equation system (5) can of course be generated in any known way for solving linear equation sets. The solution of the embodiment illustrated in FIG. 5 is generated by the least square method, which minimizes measuring noise. This means in practice that a solution to the following equation set is generated:

$$A^*A\bar{e}=A^+b \quad (6).$$

$A^+$ represents the hermitian conjugate of A. Since the third step 111 is performed in FIG. 5 a first solution vector $\bar{e}$1 to equation (5) is obtained. The first element in the first solution vector $\bar{e}$1 gives an estimation value to the complex error E(1) for the transmitter number one T1. Correspondingly, the remaining elements in the first solution vector e1 give estimation values to the complex errors E(2), . . . ,E(N) for the remaining transmitters T2, . . . ,TN.

The method in FIG. 5 is restarted after the third step 111 at the first step 107, wherein the method in FIG. 5 thus is repeated over and over again. Thereby, a series of solution vectors $\bar{e}$1, $\bar{e}$2, $\bar{e}$3, . . . . will be obtained. It is this series of solution vectors $\bar{e}$1, $\bar{e}$2, $\bar{e}$3, . . . which constitutes the error signals. Concretely, This means that the error signal {E(1)} corresponding to the complex error E(1) of the transmitter number one T1 comprises the series of approximative values to the complex error E(1) being formed of said first element in the series of solution vectors $\bar{e}$1, $\bar{e}$2, $\bar{e}$3, . . . Correspondingly, of course, the remaining error signals {E(1)}, . . . ,{E(N)} corresponding to the complex errors E(2), . . . ,E(N) for the remaining transmitters T2, . . . ,TN comprise the series of approximative values formed by the remaining elements of the series of solution vectors $\bar{e}$1, $\bar{e}$2, $\bar{e}$3, . . . .

For an unambiguous solution of the equation (6) to exist, it is required that the matrix, A comprises as many linear independent rows as there are transmitters (columns), i.e., N linear independent rows. Therefore, it is important that the sampling time points $t_k$ k=1, . . . ,M in the first step 107 in FIG. 5 are selected in such a way that N rows in the matrix A become linear independent. This is fulfilled if the sampling time points $t_k$ k=1, . . . ,M have been selected so the desired antenna diagram at transmission differs sufficiently from the different sampling time points $t_k$ k=1, . . . ,M. Therefore, if the invention is used in a TDMA system it is suitable to select the sampling time points $t_k$ k=1, . . . ,M to correspond to different time slots, as the radio communication with different mobile stations occurs in different time slots; in particular the sampling time points $t_k$ k=1, . . . ,M are to be selected in such a case in time slots where the communication occurs with mobile stations located in very different directions. If the invention is used in a TDMA system, in which the capacity is not fully employed, and free time slots therefore exist, of course the requested complex amplifications A(t, 1), . . . A(t, N) and the sampling time points $t_k$ k=1, . . . ,M can be selected in any of said time slots, so the matrix A obtains properties helping the solution of the equation. Nevertheless, the requested complex amplifications A(t, 1), . . . ,A(t, N) are to be selected with respect to that the radiation from the group antenna system 11 does not interfere with other radio communication.

Figure 6:
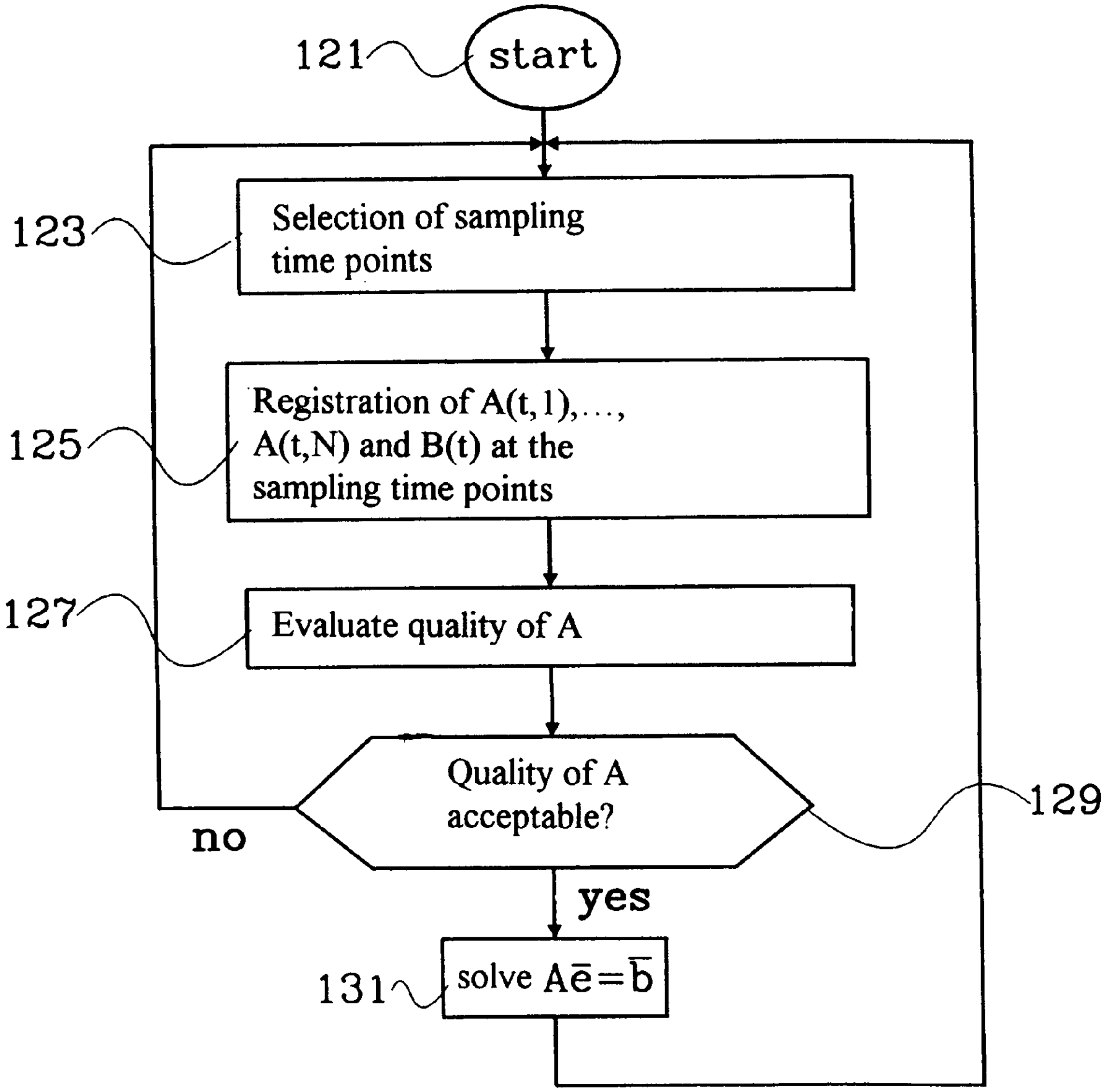
FIG. 6 is a flowchart illustrating generation of error signals in a group antenna system.

In FIG. 6 is illustrated a flow chart illustrating yet another example of how the signal processing unit 59 operates for generation of the error signals {E(1)}, . . . ,{E(N)}. The flow chart in FIG. 6 comprises a number of steps precisely corresponding to steps in FIG. 5. Therefore, only the steps in FIG. 6 not corresponding to any step in FIG. 5 will be described in more detail. The method in FIG. 6 give normally better approximative values to the complex errors E(1), . . . , E(N) compared to the method in FIG. 5.

The method in FIG. 6 is initiated, after a start 121, with a first step 123, exactly corresponding to the first step 107 in FIG. 5.

The method in FIG. 6 proceeds with a second step 125, exactly corresponding to said second step 109 in FIG. 5.

The method in FIG. 6 proceeds by a third step 127, implying that the numerical quality of the matrix A is evaluated by the signal processing unit 59. This is accomplished by the signal processing unit 59 by calculating a determinant to real part or imaginary part of the matrix $A^+A$. The greater the value of the calculated determinant, the better the numerical quality. The numerical quality of the matrix A can of course also be evaluated in some other way. For instance a determinant can, if the selected number (M) of sampling time points $t_k$ k=, . . . ,M corresponds to the number of transmitters (N) of the matrix A be calculated to real part or imaginary part as a measurement of the numerical quality—a greater value of the determinant also here means a better numerical quality.

The method in FIG. 6 proceeds in a third step 129, implying that the signal processing unit determines if the quality of the matrix A is considered acceptable, i.e., if the calculated determinant is greater than a particular predetermined value. If the response of said question is no, the method in FIG. 6 restarts from the first step 123. The method in FIG. 6 proceeds as described until it in the fourth step is determined if the numerical quality of the matrix A is acceptable, wherein a fifth step 131 is performed in FIG. 6.

The fifth step 131 in FIG. 6 corresponds exactly to the third step 111 in FIG. 5. After the fifth step 131, the method in FIG. 6 restarts from the first step 123. In the method in FIG. 6, correspondingly as in FIG. 5, a series of solution vectors $\bar{e}1$, $\bar{e}2$, $\bar{e}3$, . . . will be obtained, and the error signals {E(1)}, . . . ,{E(N)} are formed, correspondingly to the method in FIG. 5, by a series of solution vectors $\bar{e}1$, $\bar{e}2$, $\bar{e}3$, . . . .

What is disclosed in connection to FIG. 5, about the importance of selection of sampling time points $t_k$ k=1, . . . ,M in a suitable way for helping the solving of equations of course is applicable to the method in FIG. 6.

Figure 7:
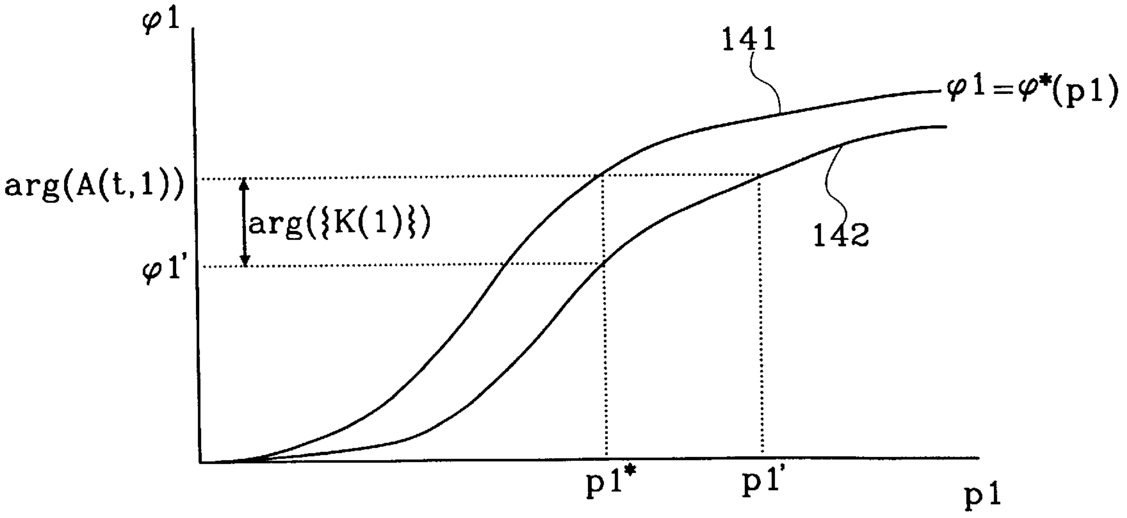
FIG. 7 is a diagram illustrating control of a transmitter in a group antenna system.

In FIG. 7 is illustrated a diagram illustrating how the control unit 36 generates the control signal p1 for controlling the controllable phase shifter 91-1 of the transmitter number one T1 employing the correction signal {K(1)}. In FIG. 7 is illustrated a curve 141, which schematically, discloses a nominal relation (ϕ*(p1) between the phase shift (ϕ1 for the transmitter T1 and the control signal p1. A requested phase shift for the transmitter number one T1 is given by an argument to the requested complex phase shift arg(A(t, 1)) for the transmitter number one T1. Nominally, the requested phase shift arg(At, 1)) for the transmitter number one would be obtained with a nominal value p1* of the control signal p1, as illustrated in FIG. 7. Due to the complex error E(1), the nominal value p1* will not result in the phase shift ϕ1 for the transmitter number one T1 corresponding to the requested phase shift arg(A(t, 1)). The transmitter T1 has an actual characteristic 142 resulting in an actual phase shift ϕ1'. To be able to have the phase shift ϕ1 for the transmitter number one T1 to correspond to the requested phase shift arg(A(t, 1)), the control unit 36 calculates a new value p1' of the control signal from the argument of the correction signal arg({K(1)}) and the nominal characteristic 141. If the slopes of the nominal characteristic 141 and the actual characteristic 142 are equal in the area about the operating point, the correct phase shift will be obtained. This case is illustrated in FIG. 7. However, if the nominal characteristic 142 and the actual characteristic 143 have different slope, also the new value p1' of the control signal p1 will give a false phase shift. By repeated measurement and correction of the control signal p1 is obtained a successive more accurate value of the phase shift, the iterative process can be continued until the desired accuracy is obtained.

Figure 8:
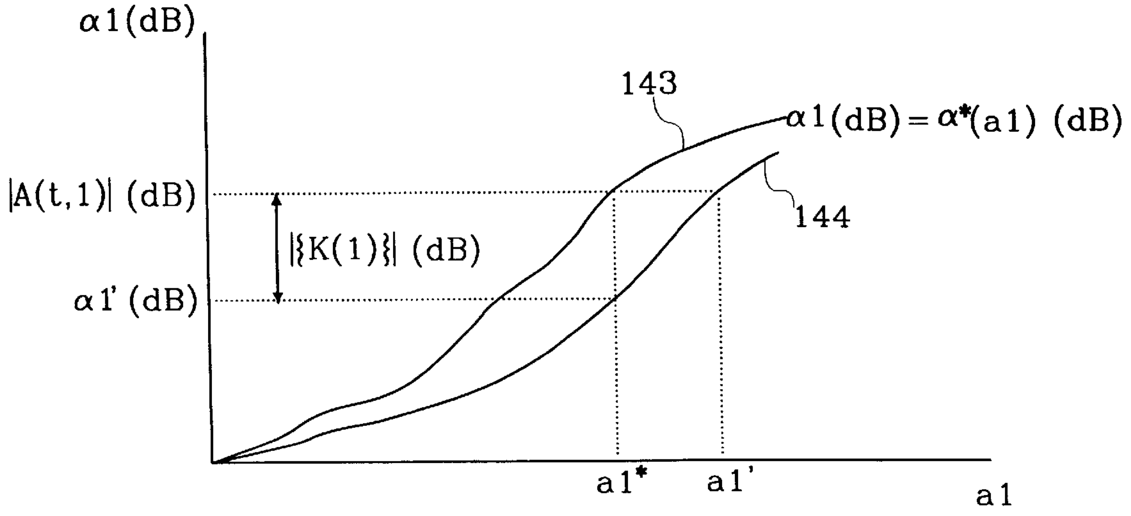
FIG. 8 is a diagram illustrating control of a transmitter in a group antenna system.

In FIG. 8 is shown a diagram illustrating how the control unit generates the control signal al for controlling the controllable amplifier 93-1 of the transmitter number one T1. In FIG. 8 is shown a curve 143, schematically describing a nominal relation α*(a1) (in decibel) between the amplification α1 (in decibel) for the transmitter number one T1 and the control signal a1. A requested amplification for the transmitter number one T1 is given by a sum to the requested complex amplification |A(t, 1)| for the transmitter number one T1. The actual characteristic for the transmitter T1 is illustrated in FIG. 8 and designated with reference numeral 144. For correcting the complex error E(1) and thereby obtain the amplification α1 for the transmitter number one T1 to correspond to the requested amplification |A(t, 1)|, the control unit 36 calculates—correspondingly as disclosed in FIG. 7—a new value a1' of the control signal a1 from, a sum of the correction, signal (in decibel) and the nominal characteristic 143. If the slopes of the nominal characteristic 143 and the actual characteristic 144 are equal in the area about the operation point, the right amplification will be obtained. This case is illustrated in FIG. 8. However, if the nominal characteristic 143 and the actual characteristic 144 have different slope, also the new value a1' of the control signal a1 will give a false amplification. However, by repeated measurement and correction of the control signal a1 a successive better value of the amplification is obtained. The iterative process can be continued until the desired accuracy is obtained.

The control unit 36 comprises memory means, comprising data corresponding to the curves 141 and 143 in FIG. 7 and FIG. 8. The control of the remaining transmitters T2, . . . ,TN are of course the same as for the transmitter number one T1.

Herein, it has been disclosed how the group antenna system 11 is calibrated during operation, without disrupting the normal use. Of course, it is nothing hindering, that the present invention is performed during particular calibration sets, when the normal use of the group antenna system 11 is stopped. If the calibration is done during particular calibration sets, of course the requested complex amplifications A(t, 1), . . . ,A(t, N) and the sampling time points $t_k$ k=1, . . . , can be selected in such a way that the matrix A obtain as good numerical properties as possible. Of course, the input signal S(t) does not have to be a modulated signal during such a calibration set, but can also be a special calibration signal. If the calibration is performed during calibration sets, the antenna system 11 can be provided with means isolating said transmitters from the radiation elements X1, . . . ,XN during the calibration sets, so other radio traffic is not disturbed independently of how the requested complex amplifications A(t, 1), . . . ,A(t, N) are selected during said calibration sets.

What is claimed is:

1. A method of calibration at a group antenna system (11), said group antenna system comprising at least two transmitters (T1, . . . , TN), in which each transmitter comprises control means (91-1, . . . ,91-N; 93-1, . . . ,93-N) for controlling a complex amplification of each transmitter, and said group antenna system furthermore comprising at least two radiation elements (X1, . . . XN), the method comprising the steps of:

a) supplying an input signal to the transmitters (T1, . . . ,TN); and b) transmitting output signals from the transmitters (T1, . . . ,TN), characterized in the steps of:

c) transferring the output signals to the radiation elements (X1, . . . ,XN);

d) generating control signals to the control means (91-1, . . . ,91-N; 93-1, . . . ,93-N) of the transmitters (T1, . . . ,TN) in dependence on time varying requested complex an amplifications and error signals associated with the transmitters, wherein the time varying requested complex amplifications correspond to a time varying antenna diagram for transmission, and the error signals indicate complex errors of the transmitters;

e) generating a sum signal corresponding to a sum of the output signals while generating the control signals to the control means in accordance with step e); and f) generating the error signals in dependence on the input signal, the sum signal and the time varying requested complex amplifications.

2. A method of calibration according to claim 1, wherein the step e) comprises the following sub steps of:

g) generating a correction signal for each transmitter (T1, . . . ,TN) by a noise-reducing filtering of the error signal for each transmitter; and h) generating the control signals to the control means (91-1, . . . ,91-N; 93-1, . . . ,93-N) for each transmitter (T1, . . . ,TN) depending on the requested complex amplification for each transmitter, as well as the correction signal for each transmitter.

3. A method of calibration according to claim 1, wherein the sub step f) comprises the following sub steps of:

i) performing a quadrature demodulation of the sum signal relative to the input signal, thereby obtaining an in-phase signal and a quadrature-phase signal, the in-phase signal and the quadrature-phase signal constituting components of a complex signal: and j) generating the error signals depending on the complex signal, as well as the requested complex amplifications.

4. A method of calibration according to claim 3, wherein the sub step j) comprises the sub steps of:

k) selecting a series of sampling time points;

l) registration of the requested complex amplifications and the complex signal at the sampling time points, whereby a first series of complex values is obtained, corresponding to the registration of the requested complex amplifications, and a second series of complex values, corresponding to the registration of the complex signal; and m) generating series of approximate values to the complex errors depending on the first series of complex values, as well as the second series of complex values, wherein the series of approximate values of the complex errors constitute the error signals.

5. A method of calibration according to claim 4, wherein the sub step m) comprises the following sub steps of:

n) generating a matrix A according to a predetermined pattern with values from said first series of complex values;

o) generating a vector b according to a predetermined pattern with values from the second series of complex values;

p) generating a quality value corresponding to a numerical quality of the matrix A;

q) generating a solution to a equation set Ae=b, when the quantity value exceeds a predetermined value, wherein a solution vector is obtained to the equation set; and r) repeating the sub steps n) to q), whereby a series of solution vectors is obtained, wherein the series of approximation values comprises element values of the solution vectors.

6. A method of calibration according to claim 5, wherein:

the step a) comprises that the supplied input signal is a for radio traffic modulated signal, in which the radio traffic according to time is divided in time slots for communication with different radio communication units; and the sub step k) comprises that the sampling time points are selected corresponding to different time slots.

7. A method of calibration according to claim 5, wherein the sub step q) comprises that the solution of the equation set is generated according to the least square method.

8. A method of calibration according to claim 4, wherein the sub step m) comprises the sub steps of:

s) generating a matrix A according to a predetermined pattern with values from the first series of complex values;

t) generating a vector b according to a predetermined pattern with values from the second series of complex values;

u) generating a solution to an equation set Ae=b, whereby a solution vector is obtained to the equation system, wherein the sub step k) comprises that the sampling time points have been selected in such a way that the equation set is possible to solve; and v) repeating the sub steps of s) to u), wherein a series of solution vectors is obtained, wherein the series of approximation values consists of element values of the solution vectors.

9. A method of calibration according to claim 8, wherein the sub step k) comprises that the sampling time points are selected so that the required antenna diagram at transmission differs sufficiently from the selected sampling time points, so the equation set is possible to solve.

10. A method of calibration according to claim 9, wherein the step a) comprises that the supplied input signal is a for radio traffic modulated signal, in which the radio traffic according to time is divided in time slots, wherein the capacity is not fully used, so there will be idle time slots;

that the required antenna diagram varies sufficiently in the free time slots; and that the sub step k) comprises that the sampling time points are selected in the idle time slots.

11. A method of calibration according to claim 8, wherein the sub step u) comprises that the solution to the equation set is generated according to the least square method.

12. A group antenna system (11), comprising:

at least two transmitters (T1, . . . ,TN, each transmitter comprising control means (91-1, . . . , 91-N; 93-1, . . . , 93-N) for controlling a complex amplification of each transmitter;

at least two radiation elements (X1, . . . XN);

means for supplying an input signal to the transmitters (T1, . . . TN), wherein said transmitters are arranged to transmit output signals; and means for transferring the output signals to the radiation elements (X1, . . . XN), wherein:

the group antenna system (11) is arranged to generate control signals to the control means (91-1, . . . , 91-N; 93-1, . . . , 93-N) for each transmitter (T1, . . . , TN) depending on a requested complex amplification varying with time for each transmitter, as well as an error signal for each transmitter corresponding to a complex error for each transmitter, wherein the requested complex amplifications are depending on an with time varying desired antenna diagram;

the group antenna system comprises means for generating a sum signal corresponding to a sum of the output signals while the control signals to the control means are generated; and the group antenna system (11) is arranged to generate the error signals in dependence on the input signal, the sum signal and the time varying requested complex amplifications.

13. A group antenna system (11) according to claim 12, wherein:

the group antenna system (11) comprises a control filter (72) which is arranged to receive the error signals and thereby generate a correction signal for each transmitter (T1, . . . , TN) by a noise-reducing filtering of the error signal for each transmitter; and the group antenna system (11) is arranged to generate the control signals to the control means (91-1, . . . , 91-N; 93-1, . . . , 93-N) for each transmitter (T1, . . . , TN) depending on the requested complex amplification for each transmitter as well as the correction signal for each transmitter.

14. A group antenna system (11) according to claim 12, wherein:

the group antenna system comprises means (47) for performing a quadrature demodulation of the sum signal relative to the input signal, thereby obtaining an in-phase signal and a quadrature-phase signal, the in-phase signal and the quadrature-phase signal constituting components of a complex signal; and the group antenna system (11) is arranged to generate the error signals depending on the complex signal and the time varying requested complex amplifications.

15. A group antenna system (11) according to claim 14, wherein:

the group antenna system (11) is arranged to select a series of sampling time points;

the group antenna system (11) is arranged to register the requested complex amplifications and the complex signal at the sampling time points, wherein the group antenna system thereby is arranged to generate a first series of complex values, corresponding to the registration of the requested complex amplifications, and a second series of complex values, corresponding to the registration of the complex signal; and that the group antenna system (11) is arranged to generate series of approximate values to the complex errors depending on the first series of complex values, as well as the second series of complex values, wherein the series of approximate values to the complex errors constitute the error signals.

16. A group antenna system (11) according to claim 15, wherein:

the group antenna system (11) is arranged to generate a matrix A according to a predetermined pattern with values from the first series of complex values;

the group antenna system is arranged to generate a vector b according to a predetermined pattern with values from the second series of complex values;

the group antenna system (11) is arranged to generate a quality value corresponding to a numerical quality of the matrix A;

the group antenna system (11) is arranged to generate a solution to the equation set Ae=b, when the quality value exceeds a predetermined value, wherein the group antenna system generates a solution vector to the equation set; and the group antenna system (11) correspondingly repeatedly generates matrixes A, vectors b, quality values for the matrixes A and solutions to corresponding equation systems Ae=b, wherein the group antenna system generates a series of solution vectors, wherein the series of approximate values comprise element values of the solutions vectors.

17. A group antenna system (11) according to claim 16, wherein the group antenna system (11) is arranged to generate the solutions to the equation set according to least square method.

18. A group antenna system (11) according to claim 15, wherein the group antenna system (11) is arranged to generate a matrix A according to a predetermined pattern with values from the first series of complex values;

the group antenna system (11) is arranged to generate a vector b according to a predetermined pattern with values from the second series of complex values;

the group antenna system (11) is arranged to generate a solution to an equation set Ae=b, wherein the group antenna system thereby is arranged to generate a solution vector to the equation set, and wherein the group antenna system is arranged to select the sampling time points in such a way that the equation system is possible to solve; and the group antenna system (11) correspondingly generates repeatedly matrixes A, vectors, b, and solutions to corresponding equation sets Ae=b, wherein the group antenna system thereby generates a series of solution vectors, wherein the series of approximate values comprise element values of the solution vectors.

19. A group antenna system (11) according to claim 18, wherein the group antenna system (11) generates the solutions to the equation sets according to the least square method.

20. The method of claim 1, wherein the group antenna system (11) is part of a radio communication system.

21. The method of claim 20, wherein the radio communication system is a mobile telephony system.

22. The method of claim 21, wherein the mobile telephony system is a TDMA system.

23. The group antenna system of claim 12 wherein the group antenna system is part of a radio communication system.

24. The group antenna system of claim 23, wherein the radio communication system is a mobile telephony system.

25. The group antenna system of claim 24, wherein the mobile telephony system is a TDMA (Time Division Multiple Access) system.

* * * * *